United States Patent
Wu et al.

(10) Patent No.: US 12,505,061 B2
(45) Date of Patent: Dec. 23, 2025

(54) COMPUTER DEVICE, VIRTUAL ACCELERATION DEVICE, DATA TRANSMISSION METHOD, AND STORAGE MEDIUM

(71) Applicant: Hangzhou AliCloud Feitian Information Technology Co., Ltd., Hangzhou (CN)

(72) Inventors: Binbin Wu, Hangzhou (CN); Xiantao Zhang, Hangzhou (CN); Junkang Fu, Hangzhou (CN); Gan Wen, Hangzhou (CN); Jinkui Ren, Hangzhou (CN)

(73) Assignee: Hangzhou AliCloud Feitian Information Technology Co., Ltd., Hangzhou (CN)

( * ) Notice: Subject to any disclaimer, the term of this patent is extended or adjusted under 35 U.S.C. 154(b) by 14 days.

(21) Appl. No.: 18/377,249

(22) Filed: Oct. 5, 2023

(65) Prior Publication Data
US 2024/0037059 A1 Feb. 1, 2024

Related U.S. Application Data

(63) Continuation of application No. PCT/CN2022/084279, filed on Mar. 31, 2022.

(30) Foreign Application Priority Data

Apr. 6, 2021 (CN) .......................... 202110365740.5

(51) Int. Cl.
*G06F 13/42* (2006.01)
(52) U.S. Cl.
CPC .. *G06F 13/4282* (2013.01); *G06F 2213/0002* (2013.01)

(58) Field of Classification Search
CPC ....................................................... G06F 3/067
See application file for complete search history.

(56) References Cited

U.S. PATENT DOCUMENTS

| | | | |
|---|---|---|---|
| 7,484,018 B2 * | 1/2009 | Szabelski | G06F 13/385 710/63 |
| 11,442,767 B2 * | 9/2022 | Elliott | G06F 9/45558 |

(Continued)

FOREIGN PATENT DOCUMENTS

| | | |
|---|---|---|
| CN | 107122224 A | 9/2017 |
| CN | 108595248 A | 9/2018 |

(Continued)

OTHER PUBLICATIONS

International Search Report mailed May 31, 2022, from PCT/CN2022/084279, 2 pages.

(Continued)

*Primary Examiner* — Henry Tsai
*Assistant Examiner* — Juanito C Borromeo
(74) *Attorney, Agent, or Firm* — Lee & Hayes, P.C.

(57) ABSTRACT

A virtual acceleration device is deployed for a physical machine. The physical machine and the virtual acceleration device are interconnected through a high-speed serial bus. A serial port device for the physical machine can be virtualized and implemented on the virtual acceleration device. The physical machine can send and receive serial port data through the virtual serial port device. The physical machine only needs to transmit data to the virtual serial port device through the high-speed serial bus, and subsequent transmission actions are completed by the virtual acceleration device. With the advantages of the high-speed serial bus in the transmission speed, the transmission rate of serial port data of the physical machine can be greatly improved, which is beneficial to improving the utilization rate of CPU of the (Continued)

physical machine, and ensuring the stability of service performance of the physical machine.

20 Claims, 6 Drawing Sheets

(56) References Cited

U.S. PATENT DOCUMENTS

| | | | |
|---|---|---|---|
| 2009/0125635 A1* | 5/2009 | Barga | G06F 11/0721 709/231 |
| 2014/0173600 A1* | 6/2014 | Ramakrishnan Nair | G06F 9/45533 718/1 |
| 2016/0019079 A1 | 1/2016 | Chawla et al. | |

FOREIGN PATENT DOCUMENTS

| | | |
|---|---|---|
| CN | 109656674 A | 4/2019 |
| CN | 112765084 A | 5/2021 |

OTHER PUBLICATIONS

Written Opinion mailed May 31, 2022, from PCT/CN2022/084279, 5 pages.
Office Action from corresponding CN Patent Application No. 202110365740.5, mailed May 18, 2021, 12 pages.
Office Action from corresponding CN Patent Application No. 202110365740.5, mailed Jun. 9, 2021, 13 pages.
Search Report from corresponding CN Patent Application No. 202110365740.5, mailed May 18, 2021, 1 page.

* cited by examiner

COMPUTER DEVICE, VIRTUAL ACCELERATION DEVICE, DATA TRANSMISSION METHOD, AND STORAGE MEDIUM

CROSS REFERENCE TO RELATED PATENT APPLICATIONS

This application claims priority to and is a continuation of PCT Patent Application No. PCT/CN2022/084279 filed on 31 Mar. 2022, and is related to and claims priority to Chinese Application No. 202110365740.5, filed on 6 Apr. 2021 and entitled "Computer Device, Virtual Acceleration Device, Data Transmission Method, and Storage Medium," which are incorporated herein by reference in their entirety.

TECHNICAL FIELD

The present disclosure relates to the field of computer technology, and in particular to computer devices, virtual acceleration devices, data transmission methods and storage media.

BACKGROUND

Universal Asynchronous Receiver/Transmitter (UART) is a logic circuit for serial port transceivers, and is usually used in an embedded system, being responsible for realizing asynchronous communications between a physical machine where it is located and external devices. During operation of the physical machine, some information can be output through UART, such as system logs, etc. However, UART is a low-speed data communication protocol, and its data output rate is slow. Especially in a situation when data output by the UART triggers a CPU shutdown interrupt, it will also cause the time for the CPU shutdown interrupt to become longer, thus reducing the utilization rate of the CPU.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Various aspects of the present disclosure provide computer devices, virtual acceleration devices, data transmission methods and storage media to improve the utilization rate of CPU and ensure the stability of service performance of a physical machine.

Embodiments of the present disclosure provide a computer device, which includes: a physical machine and a virtual acceleration device; the virtual acceleration device being connected to the physical machine through a high-speed serial bus, and a virtual serial port device for the physical machine being implemented in the virtual acceleration device, which is configured to cooperate with the physical machine to send and receive serial port data; and the physical machine being configured to identify the virtual serial port device, and send and receive the serial port data through the virtual serial port device.

The embodiments of the present disclosure also provide a virtual acceleration device, which includes: a high-speed serial bus and a virtual serial port device implemented for a physical machine; the virtual acceleration device being connected to the physical machine through the high-speed serial bus; and the virtual serial port device being configured to cooperate with the physical machine to send and receive serial port data when the virtual acceleration device is connected to the physical machine through the high-speed serial bus.

The embodiments of the present disclosure also provide a physical machine, which includes: a memory and a processor; the memory being configured to store a computer program; the processor being coupled to the memory and configured to execute the computer program to: identify a virtual serial port device, and send and receive serial port data through the virtual serial port device, wherein the virtual serial port device is implemented in the virtual acceleration device that is connected to a physical machine through a high-speed serial bus.

The embodiments of the present disclosure also provide a data transmission method, which is suitable in a virtual acceleration device. On the virtual acceleration device, a virtual serial port device for a physical machine is implemented. The method includes: receiving first serial port data sent by a physical machine through a virtual serial port device, and output the first serial port data; or receive second serial port data externally and send the second serial port data to the physical machine through the virtual serial port device; wherein the virtual acceleration device and the physical machine is connected through a high-speed serial bus.

The embodiments of the present disclosure also provide a computer-readable storage medium storing a computer program. The computer program, when executed by a processor, causes the processor to implement the steps in the data transmission method provided by the embodiments of the present disclosure.

The embodiments of the present disclosure also provide a computer program product, which includes a computer program/instruction. The computer program/instruction, when executed by a processor, causes the processor to implement the steps in the data transmission method provided by the embodiments of the present disclosure.

In the embodiments of the present disclosure, a virtual acceleration device is deployed for a physical machine. The physical machine and the virtual acceleration device are interconnected through a high-speed serial bus. A serial port device can be virtualized with the help of the virtual acceleration device, that is, a virtual serial port device is implemented in the virtual acceleration device for the physical machine. Based thereupon, the physical machine can send and receive serial port data through the virtual serial port device. For the physical machine, it only needs to transmit data to the virtual serial port device through the high-speed serial bus. Subsequent transmission operations are completed by the virtual acceleration device. With the advantage of the high-speed serial bus on the transmission speed, the rate of transmission of serial port data of the physical machine can be greatly improved. Especially when transmitting serial port data will trigger a CPU interrupt disable, this will greatly shorten the time window for the physical machine due to interrupt disable caused by the transmission of the serial port data, which is beneficial to improving the utilization rate of CPU of the physical machine and ensuring the stability of service performance of the physical machine.

BRIEF DESCRIPTION OF THE DRAWINGS

Accompanying drawings described herein are used to provide a further understanding of the present disclosure and constitute a part of the present disclosure. Illustrative embodiments of the present disclosure and their descriptions are used to explain the present disclosure and do not constitute an improper limitation to the present disclosure. In the accompanying drawings.

DETAILED DESCRIPTION

In order to make the purposes, technical solutions and advantages of the present disclosure clearer, the technical solutions of the present disclosure will be clearly and completely described hereinafter in conjunction with specific embodiments of the present disclosure and corresponding drawings. Apparently, the described embodiments represent only some and not all of the embodiments of the present disclosure. Based on the embodiments in the present disclosure, all other embodiments obtained by one of ordinary skill in the art without making any creative effort shall belong to the scope of protection of the present disclosure.

The technical solutions provided by each embodiment of the present disclosure will be described in detail below with reference to the accompanying drawings.

Figure 1A:
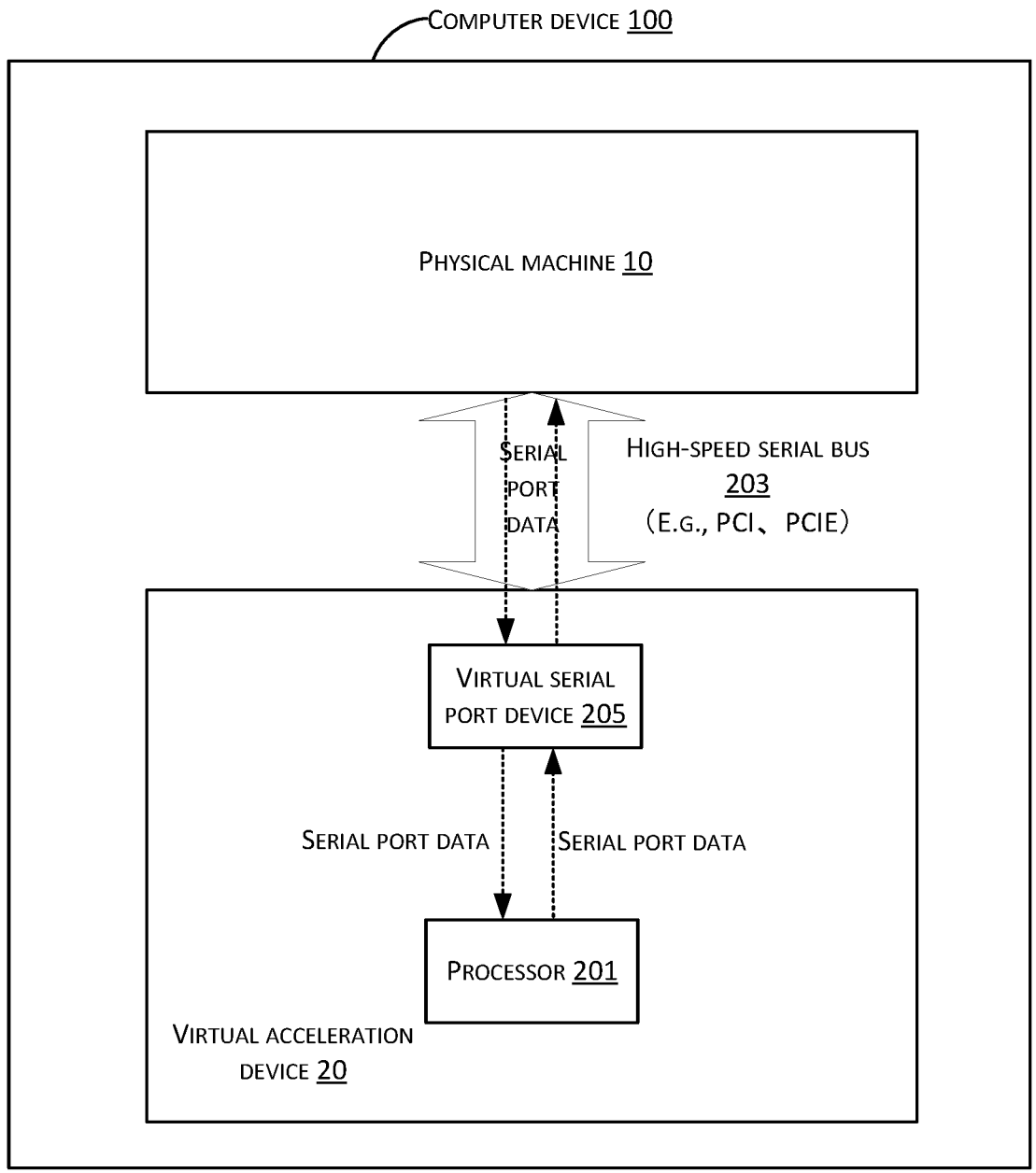
FIG. 1a is a schematic structural diagram of a computer device provided by exemplary embodiments of the present disclosure.

FIG. 1a is a schematic structural diagram of a computer device provided by the exemplary embodiments of the present disclosure. As shown in FIG. 1a, the computer device 100 at least includes: a physical machine 10 and a virtual acceleration device 20.

In implementations, the device form of the physical machine 10 is not limited, and may be any physical machine with certain computing, storage and communication capabilities, such as a terminal device such as a desktop computer, a notebook computer, a smart phone, or an IOT device, or can also be a server device such as a conventional server, a host, or an array of servers. In addition, this embodiment does not limit the structure of implementation of the physical machine 10, which may include internal components such as a processor, a memory, a network card chip, an IO bus, and an audio and video component, etc. The physical machine 10 may also include non-volatile storage resources such as a hard disk and a SSD card. Apparently, the physical machine 10 may not include non-volatile storage resources such as hard disks and SSD cards, and may instead realize virtualization of storage resources with the help of the virtual acceleration device 20 and connect to cloud storage resources, such as cloud disks, network-attached storage devices (NetWork Attached Storage, NAS), etc.

In addition to the internal components described above, the physical machine 10 can also run an operating system (OS), one or more application programs, etc., where the OS, application programs and related program data can be stored locally in non-volatile storage resources of the physical machine 10 or cloud storage resources. Further, in implementations, the physical machine 10 may also include some external devices, such as a keyboard, a mouse, a stylus, a printer, a display, etc. It needs to be noted that the internal components included in the physical machine 10 or external devices, such as audio and video components, displays, etc., may vary depending on the device form. For example, if the physical machine 10 is a terminal device, audio and video components, a display, etc., may be included. If the physical machine 10 is a server device, audio and video components, a display, etc., may not be included.

Figure 1B:
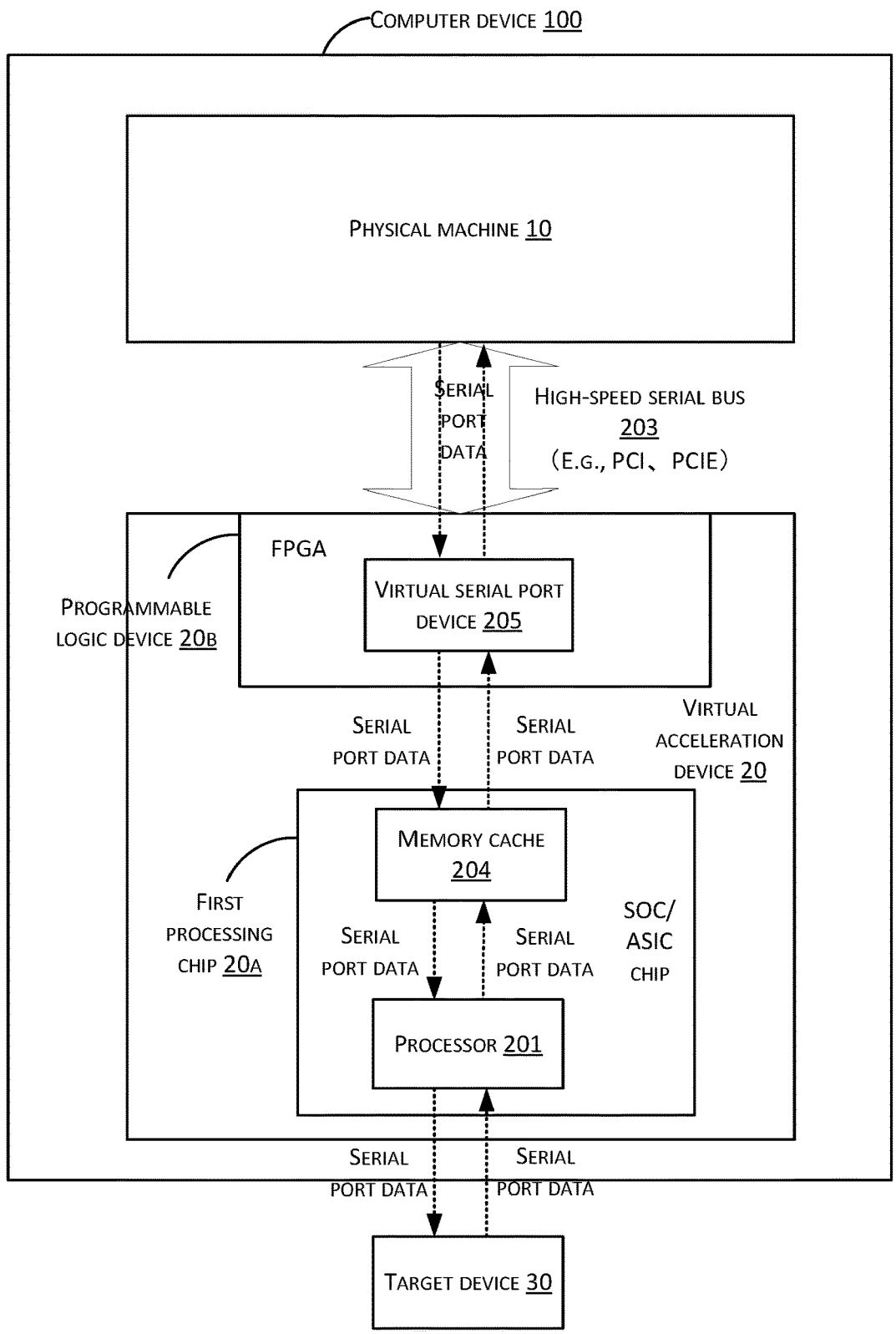
FIG. 1b is a schematic structural diagram of another computer device provided by exemplary embodiments of the present disclosure.
Figure 1C:
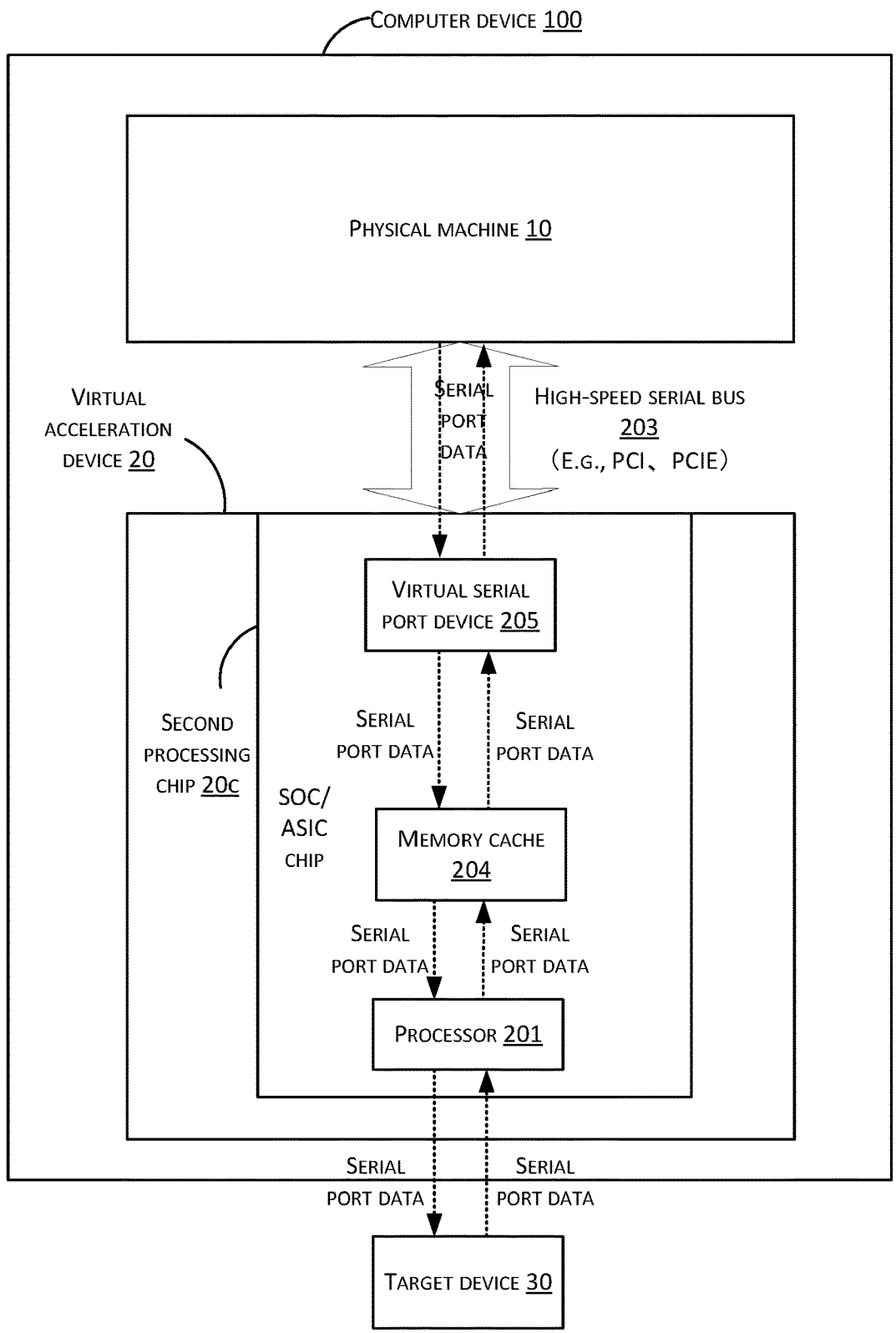
FIG. 1c is a schematic structural diagram of yet another computer device provided by exemplary embodiments of the present disclosure.
Figure 2:
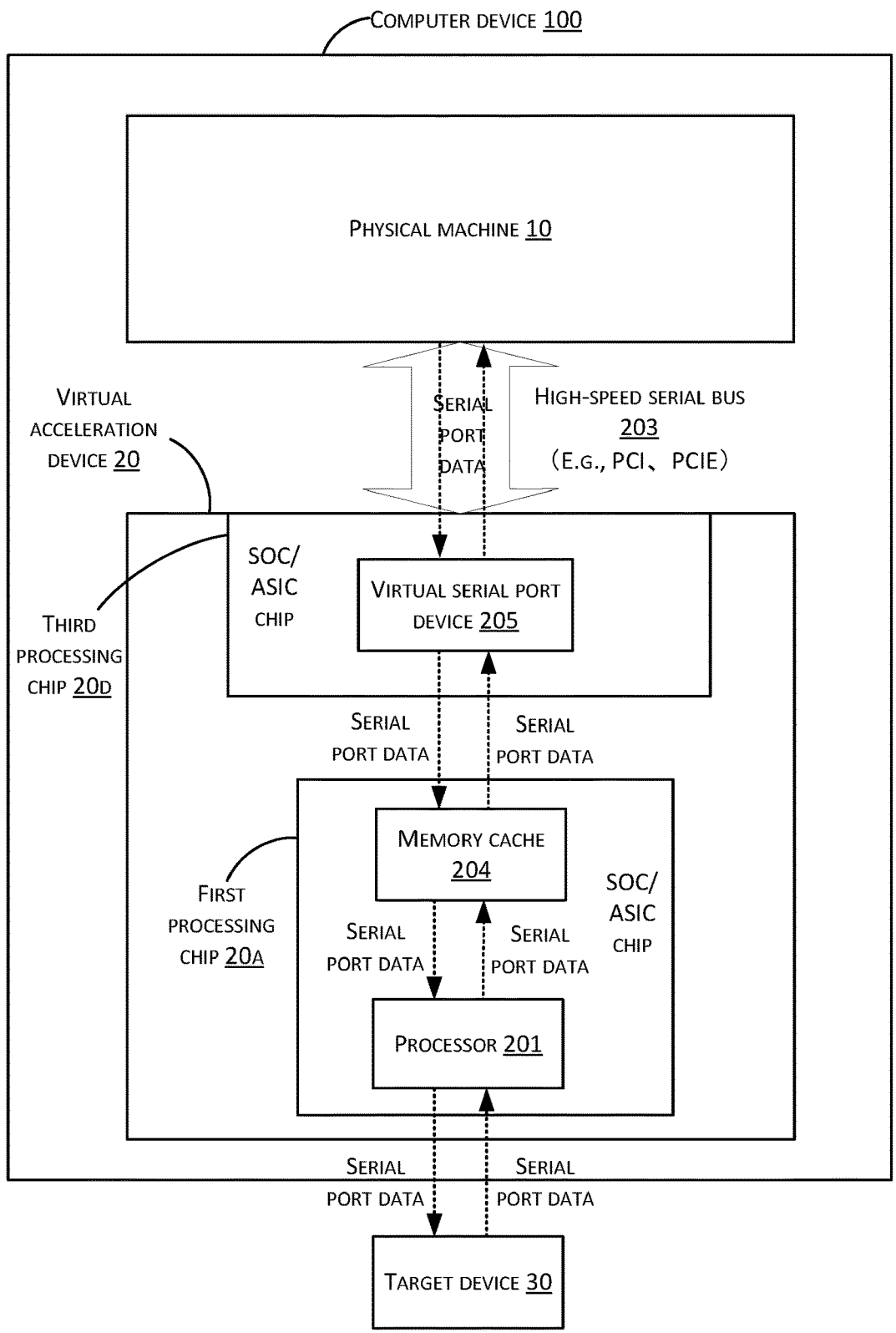
FIG. 2 is a schematic structural diagram of still another computer device provided by exemplary embodiments of the present disclosure.

In implementations, the virtual acceleration device 20 is a device that can implement virtualization technology, and can help the physical machine 10 interconnected therewith to realize at least parts of virtualization functions, that is, the physical machine 10 can offload some or all of the virtualization functions on the virtual acceleration device 20, thereby obtaining performance acceleration. This embodiment does not limit the implementation form of the virtual acceleration device 20, which may be a board or a chip. As shown in FIG. 1a, the virtual acceleration device 20 has an external interface, such as a high-speed serial bus 203, which includes, but is not limited to: a peripheral component interconnect (PCI) bus, a peripheral component interconnect express (PCIE) bus. In implementations, as shown in FIG. 1a, the virtual acceleration device 20 has its own computing resources, such as a processor 201, where the processor 201 can be a CPU, a GPU, a SAIC chip or a SOC chip, etc., which is not limited herein. In implementations, the virtual acceleration device 20 may also have its own storage resources, which may include, for example, local storage resources such as memory and hard disks, or cloud storage resources such as cloud disks and NAS. A memory cache 204 as shown in FIG. 1b-FIG. 2 is a local storage resource of the virtual acceleration device 20. Further, the virtual acceleration device 20 also has a network card and its own network resources, which are not shown in FIG. 1a.

In implementations, the virtual acceleration device 20 adopts an integrated design of software and hardware, and includes not only some of the hardware resources mentioned above, but also software resources that run on the hardware resources, such as an operating system, software used for implementing virtualization technology, and drivers for related hardware. The software used for implementing the virtualization technology can use, but not limited to: a hypervisor, also known as a virtual machine monitor. The hypervisor is an intermediate software that runs between hardware and an operating system. This software allows multiple operating systems and applications to share a set of basic physical resources. Therefore, it can also be regarded as a "meta" operating system in a virtual environment, and is the core of virtualization technology.

In implementations, the virtual acceleration device 20 is interconnected with the physical machine 10 through the high-speed serial bus 203, that is, the physical machine 10 is equipped with the virtual acceleration device 20, which can ensure the reliability and efficiency of transmission of information between the two. This provides conditions for offloading parts or all of virtualization logics of computing, storage, networking, etc. that are implemented in the physical machine 10 to the virtual acceleration device 20. On this basis, with the help of the software and hardware resources of the virtual acceleration device 20, parts of the virtualization logics such as computing, storage, and networking, etc., that are originally implemented on the physical machine 10 can be offloaded to the virtual acceleration device 20. This can not only improve the performance of virtualization and reduce the costs, but also ensure that the physical machine 10 has the functions of a virtual machine, thus enabling to connect with cloud disks and VPC networks just like the virtual machine, and further ensuring that the physical machine 10 can use its own resources such as computing, storage, and the like independently without the problem of sharing resources by multiple virtual machines. This thereby turning the physical machine 10 into a computing device that has both the flexibility of a virtual machine and the performance of a physical machine. Such computing device has a relatively high isolation, and has advantages of virtual machine migration and elastic cloud deployment value. It can also support fast delivery, compatible virtual machine mirroring, cloud storage device startup, cloud storage device attachment, migration and recovery of failed physical machine, automatic operation and maintenance, etc., having a high application value. In addition, the virtual acceleration device 20 is interconnected with the physical machine 10 through the high-speed serial bus 203, which can ensure the reliability and efficiency of information transmission between the two. Apparently, the virtual acceleration device 20 may also be interconnected with the physical machine 10 through other means, such as network interconnection.

In practical applications, the physical machine 10 often needs to output some information, e.g., system logs, through a physical serial port device, such as a UART device. However, the output rate of the built-in serial port device on the physical machine 10 is slow. Especially in some application scenarios, an interrupt disable of a processor associated with the physical machine 10 may be triggered when the physical machine 10 outputs data through a physical serial port device. When the processor disables interrupts, the processor may not respond in time, resulting in fluctuations in service performance and decline in user experience. In view of this, in the embodiments of the present disclosure, a virtual serial port device 205 for the physical machine 101 can be implemented with the help of the virtual acceleration device 20. For example, the virtual serial port device 205 for the physical machine 101 can be implemented on a first processing chip of the virtual acceleration device 20, so that the virtual serial port device 205 enables the physical machine 10 to send and receive serial port data through the virtual serial port device 205. For the physical machine 10, it only needs to transmit serial port data to be sent to the virtual serial port device 205, or only needs to read serial port data to be received from the virtual serial port device 205 through the high-speed serial bus 203. Other processing actions related to sending and receiving serial port data are completed on the virtual acceleration device 20. With the advantages of the high-speed serial port bus in the transmission speed, the rate of transmission of serial port data can greatly be increased. Especially when transmitting serial port data triggers a CPU to disable interrupts, it greatly shortens the time window of the physical machine 10 due to disabling of interrupts caused by transmitting serial port data, which is beneficial to improve the utilization rate of CPU and ensure the stability of service performance of the physical machine 10.

In implementations, the virtual acceleration device 20 uses PCI or PCIE to interconnect with the physical machine 10. With respect to the physical machine 10, the virtual acceleration device 20 can be regarded as a PCI or PCIE device mounted on the physical machine 10. As such, the virtual acceleration device 20 has its own configuration space, which is used to store some description information of the virtual acceleration device 20, such as the manufacturer of the virtual acceleration device, the attributes of the virtual acceleration device (what kind of device the virtual acceleration device is) or the functions that can be realized by the virtual acceleration device 20, etc. Based thereupon, when implementing the virtual serial port device 205 on the virtual acceleration device 20, multiple registers required by the serial port device may be configured in the virtual acceleration device 20, and the multiple registers may be mapped into the configuration space of the virtual acceleration device 20 to realize the virtual serial port device 205.

Based on the above, when the physical machine 101 identifies the virtual serial port device 205, devices on the high-speed serial bus 203 can be enumerated. Enumeration refers to a process of traversing all the devices that are mounted on the high-speed serial bus 203, and obtaining respective information corresponding to the devices in the configuration space. In the entire process, the physical machine 10 can discover all the devices that are mounted on the high-speed serial bus 203 based on respective information of each device in the configuration space. In implementations, the physical machine 101 can enumerate the devices on the high-speed serial bus according to a specified time period. Such time period can be 1 second, 1 minute, or 1 hour, etc. Alternatively, enumerating the devices on the high-speed serial bus can also be performed every time when powered on. In implementations, first, the virtual acceleration device 20 can be identified. Further, when the virtual acceleration device 20 is discovered, the virtual serial port device 205 can be identified based on values of at least part of the registers in its configuration space, and a driver of the virtual serial port device 205 can ben loaded. The at least part of the registers may be part of registers related to the serial port device 205, or all the registers related to the serial port device 205, which is not limited herein.

In the embodiments of the present disclosure, considering that the physical machine 10 has its own serial port device, in order to facilitate the physical machine 10 to send and receive serial port data through the virtual serial port device 205, and not to use the built-in serial port device any more, the physical machine 10 can name the virtual serial port device 205 when the virtual serial port device 205 is identified for the first time. For example, A default naming method for serial port devices can be used. For example, the name of the virtual serial port device 205 can be a serial port identifier+a number, e.g., ttyS0, ttyS1 or ttyS2, etc. After naming the virtual serial port device, a serial port name in a default serial port output parameter of the operating system is modified to the name of the virtual serial port device. This is so that serial port data can be sent and received through the virtual serial port device 205 in the future. In implementations, a method of modifying a serial port name in a serial port output parameter includes: entering a startup interface of the operating system when the physical machine is powered on, and modifying the serial port name in the serial port output parameter through a command line, which is, however, not limited thereto.

In implementations, the virtual acceleration device 20 further includes: a memory cache 204, as shown in FIG. 1b-FIG. 2. The memory cache 204 is configured to cache serial port data sent and received by the physical machine 10 through the virtual serial port device 205. For convenience of description and distinction, serial port data that the physical machine 10 needs to send is called first serial port data, and serial port data that the physical machine 10 needs to receive is called second serial port data. The following describes a process in which the virtual acceleration device 20 cooperates with the physical machine 10 to send and receive serial port data through the virtual serial port device 205:

A process of sending first serial port data by the physical machine 10 through the virtual serial port device 205: first, the physical machine 10 sends the first serial port data to the virtual serial port device 205 through the high-speed serial bus, the virtual serial port device 205 outputs the first serial port data to the memory cache 204, and the processor 201 reads the first serial port data from the memory cache 204 and outputs the first serial port data. In implementations, the virtual serial port device 205 can output the first serial port data to the memory cache 204 bit by bit, and the processor 201 can read the data bits already stored in the memory cache 204 and output them before the memory cache 204 overflows. Furthermore, in implementations, the processor 201 can read the data from the memory cache 204 according to a fixed data size, for example, read one byte from the memory cache 204 in each time until all the first serial port data is read and output. In FIG. 2, outputting the first serial port data to a target device 30 is taken as an example. The target device 30 may be, but is not limited to: a host, a cloud storage device, a management device, etc., in a VPC network. For example, if the first serial port data is log data, the log data can be output to a console of the management device, and a manager of the computer device 10 can perform analysis and debugging through the console.

A process of receiving second serial port data by the physical machine 10 through the virtual serial port device 205: the processor 201 receives the second serial port data from the outside and writes the second serial port data into the memory cache 204, and the virtual serial port device 205 read the second serial port data from the memory cache 204 upon identifying data to be transmitted in the memory cache 204, and sends the second serial port data to the physical machine 10 through the high-speed serial bus 203.

In implementations, the registers required by the virtual serial port device 205 include at least: a transmitter holding register (THR), a receiver buffer register (RBR), and a line status register (LSR). THR is mainly used to cache first serial port data output by the physical machine 10. RBR is mainly used to cache second serial port data to be received by the physical machine 10. LSR is mainly used to reflect the status when serial port data is sent or received, for example, whether the serial port data in RBR has been read, whether THR can receive data, and whether the processor is in a reading state or a writing state, etc. Further, the virtual serial port device 205 may also include: an interrupt enable register (IER) and an interrupt identification register (IIR). IER is configured to send an interrupt signal to the physical machine 10 when the virtual serial port device 205 needs to send second serial port data to the physical machine 10, to enable the physical machine 10 to respond to the interrupt signal and reads the second serial port data. IIR is configured to identify current status change information of the virtual serial port device 205. Some status change information may trigger the virtual serial port device 205 to send an interrupt signal to the physical machine 10. For example, status change information that is generated due to a change in the status of RBR may trigger the virtual serial port device 205 to send an interrupt signal to the physical machine 10.

Further, in implementations, the registers required by the virtual serial port device 205 may also include: a first in first out control register (FCR), a line control register (LCR), a modem control register (MCR), a modem status register (MSR), a scratch register (SCR), etc. The serial port device 205 implemented in the embodiments of the present disclosure is virtualized. Some of the registers listed above are to realize the integrity of the serial port device 205. In practical applications, the physical machine may not perform actions in a process of sending and receiving serial port data through the virtual serial port device 205.

Based on the serial port device 205 with the above register structure, a detailed process of sending and receiving serial port data by the physical machine 10 through the serial port device 205 is as follows:

When the physical machine 10 is about to send first serial port data, the physical machine 10 can write the first serial port data into the THR through the high-speed serial bus. When detecting that there is data written into the THR, the virtual serial port device 205 outputs the first serial port data in the THR to the memory cache 204 bit by bit, and sets the THR status bit of the LSR to 1, indicating that the THR is empty, and can receive next data to be sent. After the physical machine 101 writes the data into the THR through the high-speed serial bus, and before the THR has not yet transmitted the written data to the memory cache 204, the THR status bit of the LSR remains 0, and the physical machine 10 will not continue writing data to the THR at that time. After the first serial port data is output to the memory cache 204, the processor 201 reads the data that exists in the memory cache 204 and outputs it to the target device 30.

When an external device (such as the target device 30) needs to send second serial port data to the physical machine 10, that is, when the physical machine 10 needs to receive the second serial port data, the processor 201 first receives the second serial port data input from the outside and writes the second serial port data into the memory cache 204 for reading by the virtual serial port device 205. The virtual serial port device 205 reads the second serial port data from the memory cache 204 in turn, writes the second serial port data into the RBR, and then sets the data ready status bit of the LSR to 1, indicating that the serial port data in the RBR is ready, and the physical machine 10 can read the serial port data in the RBR through the high-speed serial bus at any time. When detecting that the data ready status bit of the LSR is 1, the physical machine 10 reads the second serial port data from the RBR through the high-speed serial bus. After the second serial port data is read, the virtual serial port device 205 sets the data ready status bit of the LSR to 0, indicating that the physical machine 10 has read the data, and the virtual serial port device 205 can continue to read data from the memory cache 204 and write it into the RBR. This process is repeated until transmission of all the second serial port data is completed.

In the embodiments of the present disclosure, the hardware implementation of the structure of the virtual acceleration device 20 is not limited. In implementations, the virtual acceleration device 20 can be implemented as a pluggable board structure, as shown in FIG. 1b and FIG. 1c. Further, as shown in FIG. 1b, a first processing chip 20a and a programmable logic device 20b are included on the board implemented as the virtual acceleration device 20. The programmable logic device 20b may be a field-programmable gate array (FPGA), or a complex programmable logic device (CPLD), etc. The first processing chip 20*a* may be an ASIC chip or a SOC. As shown in FIG. 1*b*, the processor 201 and the memory cache 204 are implemented on the first processing chip 20*a*. The virtual serial port device 205 is implemented on the programmable logic device 20*b*. In FIG. 1*b*, FPGA is taken as an example for illustrating the programmable logic device 20*b*. The virtual serial port device 205 is implemented on the programmable logic device 20*b* such as FPGA mainly refers to registers that are required to realize such serial port device 202 on the programmable logic device 20*b*, and the processor 201 maps these registers to into a PCI or PCIE configuration space of the virtual acceleration device 20.

Alternatively, as shown in FIG. 1*c*, the virtual acceleration device 20 includes a second processing chip 20*c*. The processor 201, the memory cache 204 and the virtual serial port device 205 are all implemented on the second processing chip 20*c*. In implementations, the second processing chip 20*c* may use an ASIC chip or an SOC. The virtual serial port device 205 that is implemented on the virtual acceleration device 20 mainly refers to registers required to implement such serial port device 205 on the second processing chip 20, and the processor 201 maps these registers into a PCI or PCIE configuration space of the virtual acceleration device 20. In the embodiments shown in FIG. 1*c*, the second processing chip 20*c* may be a customized chip, such as a customized ASIC chip or SOC chip.

Alternatively, as shown in FIG. 2, the virtual acceleration device 20 includes a first processing chip 20*a* and a third processing chip 20*d*. The first processing chip 20*a* can be an ASIC chip or SOC. The third processing chip 20*d* can be a customized chip. For example, a customized ASIC chip or SOC can be used. As shown in FIG. 2, the processor 201 and the memory cache 204 are implemented on the first processing chip 20*a*. The virtual serial port device 205 is implemented on the third processing chip 20*d*. The virtual serial port device 205 implemented on the third processing chip 20*d* mainly refers to registers required to implement such serial port device 205 on the third processing chip 20*d*, and the processor 201 maps these registers into a PCI or PCIE configuration space of the virtual acceleration device 20.

It needs to be noted that hardware modules or devices with various functions can be implemented on the virtual acceleration device 20 as needed based on the programmable logic device 20*b*, the second processing chip 20*c* or the third processing chip 20*d* as described above. For example, hardware modules or devices required by the virtual acceleration device 20 can be implemented, or hardware modules or devices required by the physical machine 10 can be implemented, which are not limited to virtual serial port devices.

In implementations, the physical machine can send and receive serial port data through the virtual serial port device. For the physical machine, it only needs to transmit data to the virtual serial port device through the high-speed serial bus, or only needs to read data from the virtual serial port device through the high-speed serial bus. Other actions related to sending and receiving serial port data are completed by the virtual acceleration device. With the advantages of the high-speed serial bus in the transmission speed, the rate of transmitting serial port data by the physical machine can be greatly improved, which is conducive to improving the utilization rate of CPU of the physical machine and ensuring the stability of service performance of the physical machine.

Figure 3:
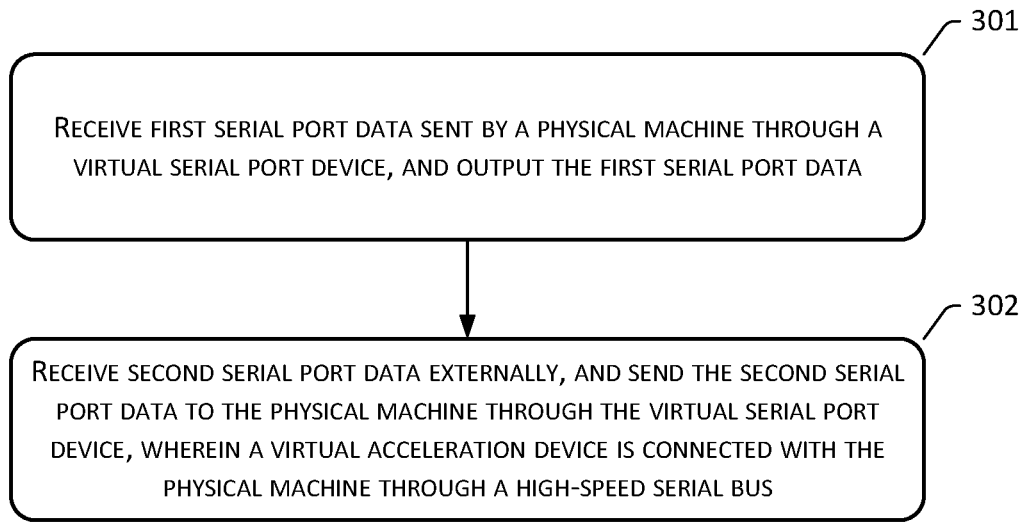
FIG. 3 is a schematic flowchart of a data transmission method provided by exemplary embodiments of the present disclosure.

The embodiments of the present disclosure also provide a data transmission method, Such method is suitable to be used in virtual acceleration device. The virtual acceleration device implements a virtual serial port device for a physical machine. As shown in FIG. 3, the method includes:

301: Receive first serial port data sent by a physical machine through a virtual serial port device, and output the first serial port data.

302: Receive second serial port data externally, and send the second serial port data to the physical machine through the virtual serial port device, wherein a virtual acceleration device is connected with the physical machine through a high-speed serial bus.

In implementations, step 301 and step 302 are in an and/or relationship. The data transmission method may only include step 301, or only include step 302, or may include both step 301 and step 302. In FIG. 3, the transmission method including step 301 and step 302 is illustrated as an example, which is, however, not a limitation.

In the data transmission method of the embodiments of the present disclosure, a virtual acceleration device is deployed for a physical machine, The physical machine and a virtual acceleration device are interconnected through a high-speed serial bus. A serial port device can be virtualized by means of the virtual acceleration device, that is, a virtual serial port device for the physical machine is implemented on the acceleration device. Based thereon, the physical machine can send and receive serial port data through the virtual serial port device. For the physical machine, it only needs to transmit data to the virtual serial port device, and subsequent transmission actions are completed by the virtualized acceleration device. With the advantages of the high-speed serial bus in the transmission speed, the transmission rate of serial port data of the physical machine can be greatly improved. Especially when transmitting serial port data will trigger a CPU interrupt disable, this will greatly shorten the time window for the physical machine due to interrupt disable caused by the transmission of the serial port data, which is beneficial to improving the utilization rate of CPU of the physical machine and ensuring the stability of service performance of the physical machine.

It needs to be noted that the execution subject of each step of the method provided in the foregoing embodiments may be the same device, or the method may also be executed by different devices. For example, the execution subject of steps 301 to 302 may be device A. For another example, the execution subject of step 301 may be device A, and the execution subject of step 302 may be device B, etc.

In addition, in some processes described in the above embodiments and accompanying drawings, multiple operations appearing in a specific order are included. However, it should be clearly understood that these operations may not be executed according to the order in which they appear herein or executed in parallel. Operation sequence numbers, such as 301 and 302, are only used to distinguish different operations, and these sequence numbers do not represent any order of execution. Additionally, these processes can include more or fewer operations, and these operations can be performed sequentially or concurrently. It should be noted that descriptions, such as "first" and "second", in this article are used to distinguish different messages, devices, modules, etc. and do not represent an order of precedence. Furthermore, "first" and "second" are not restricted to different types.

In addition to the above-mentioned computer devices, the embodiments of the present disclosure also provide a virtual acceleration device, as shown in FIGS. 1*a*-2. The virtual acceleration device 20 includes: a high-speed serial bus 203 and a virtual serial port device 205 for a physical machine 10. The virtual acceleration device 20 is connected to the physical machine 10 through the high-speed serial bus 203. The virtual serial port device 205 cooperates with the physical machine 10 to send and receive serial port data through the high-speed serial bus 203 when the virtual acceleration device 20 is connected to the physical machine 10. For details about the virtual acceleration device 20, the physical machine 10, the high-speed serial bus 203 and the virtual serial port device 205, reference can be made to the foregoing embodiments and will not be described again herein.

In implementations, the virtual acceleration device also includes a processor 201. The processor is configured to implement the virtual serial port device for the physical machine on the virtual acceleration device, and cooperate with the physical machine to send and receive the serial port data through the virtual serial port device.

In implementations, when the processor implements the virtual serial port device on the virtual acceleration device, it is specifically configured to: configure multiple registers required by the serial port device on the virtual acceleration device, and map the multiple registers into a configuration space of the virtual acceleration device for implementing the virtual serial port device.

In implementations, the virtual acceleration device 20 further includes: a memory cache 204. The memory cache can cache the serial port data sent and received by the physical machine through the virtual serial port device. When the processor cooperates with the physical machine to send and receive the serial port data through the virtual serial port device, it is specifically configured to: read first serial port data that is written by the physical machine data through the virtual serial port device from the memory cache, and outputs the first serial port data, or writes second serial port data that the physical machine needs to receive into the memory cache data for the virtual serial port device to read and send to the physical machine.

In implementations, the multiple registers include at least: THR and LSR. The virtual serial port device can output first serial port data in the THR to the memory cache after the physical machine writes the first serial port data to the THR through the high-speed serial bus, and set a THR status bit of the LSR to 1.

In implementations, the multiple registers include at least: RBR and LSR. The virtual serial port device reads second serial port data from the memory cache, writes the second serial port data into the RBR, and sets a data ready status bit of the LSR to 1, to allow the physical machine to read the second serial port data from the RBR through the high-speed serial bus. After the second serial port data is read, the data ready status bit of the LSR is set to 0.

A virtual acceleration device in the embodiments of the present disclosure is interconnected with a physical machine through a high-speed serial bus. With the help of the virtual acceleration device, a serial port device can be virtualized, that is, a virtual serial port for the physical machine is implemented on the virtual acceleration device. Based thereon, the physical machine can send and receive serial port data through the virtual serial port device. For the physical machine, it only needs to transmit data to the virtual serial port device, and subsequent transmission actions are completed by the virtualized acceleration device. With the advantages of the high-speed serial bus in the transmission speed, the transmission rate of serial port data of the physical machine can be greatly improved. Especially when transmitting serial port data will trigger a CPU interrupt disable, this will greatly shorten the time window for the physical machine due to interrupt disable caused by the transmission of the serial port data, which is beneficial to improving the utilization rate of CPU of the physical machine and ensuring the stability of service performance of the physical machine.

Correspondingly, the embodiments of the present disclosure also provide a computer-readable storage medium storing a computer program. The computer program, when executed by a processor, causes the processor to implement the steps in the data transmission method provided by the embodiments of the present disclosure.

Correspondingly, the embodiments of the present disclosure also provide a computer program product, which includes a computer program/instruction. The computer program/instruction, when executed by a processor, causes the processor to implement the steps in the data transmission method provided by the embodiments of the present disclosure.

Figure 4:
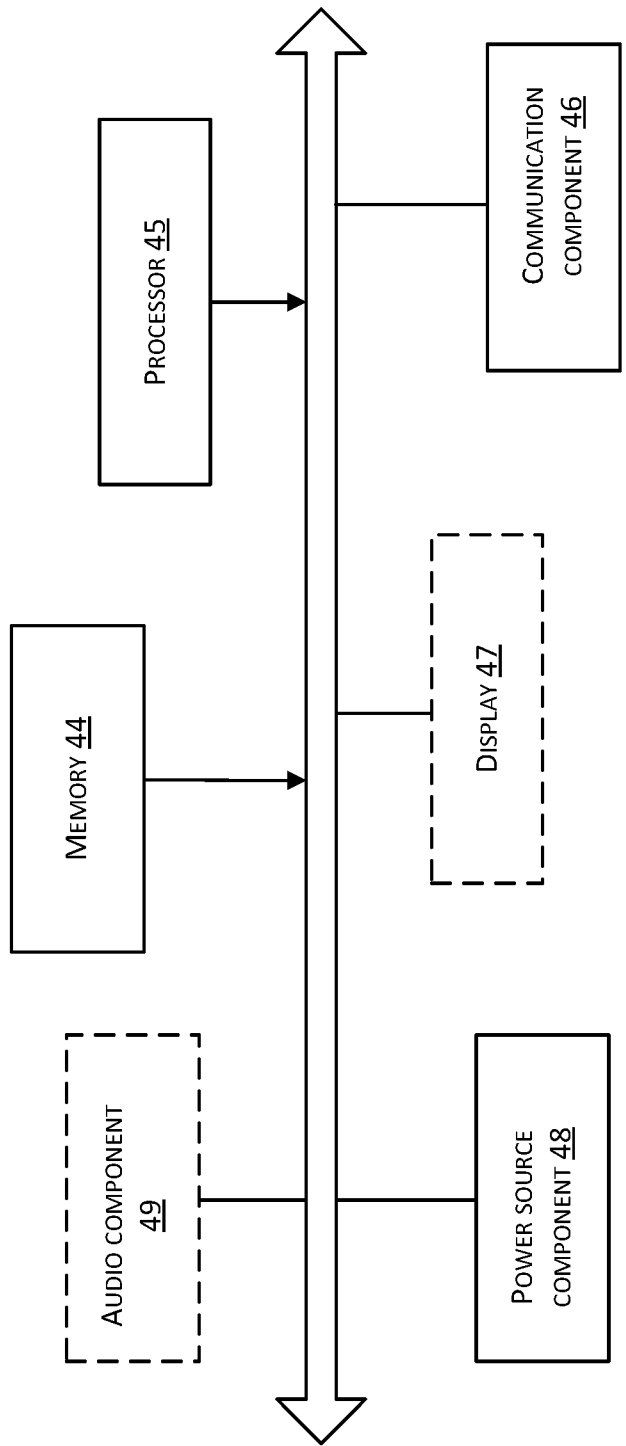
FIG. 4 is a schematic structural diagram of a physical machine provided by exemplary embodiments of the present disclosure.

In addition to the foregoing computer devices and virtual acceleration devices, the embodiments of the present disclosure also provide a physical machine, which can be connected to a virtual acceleration device in the previous embodiments through a high-speed serial bus, such as PCI or PCIE. As shown in FIG. 4, the physical machine includes: a memory 44 and a processor 45.

The memory 44 is configured to store computer programs, and can be configured to store other various data to support operations on the physical machine. Examples of such data include instructions for any application or method operating on the physical machine.

The memory 44 may be implemented by any type of volatile or non-volatile storage device or a combination thereof, such as static random access memory (SRAM), electrically erasable programmable read-only memory (EEPROM), erasable programmable read-only memory (EEPROM), programmable read-only memory (EPROM), programmable read-only memory (PROM), read-only memory (ROM), magnetic memory, flash memory, magnetic or optical disk.

The processor 45 is coupled to the memory 44 and is configured to execute a computer program in the memory 44 to: identify a virtual serial port device, and send and receive serial port data through the virtual serial port device, wherein the virtual serial port device is implemented on a virtual acceleration device that is connected with the physical machine through a high-speed serial bus.

In implementations, when identifying the virtual serial port device, the processor 45 is configured used to: enumerate device(s) on the high-speed serial bus, and identify, when a virtual acceleration device is found, the virtual serial port device according to value(s) of at least some registers in a configuration space of the virtual acceleration device.

In implementations, the processor 45 is also configured to: name the virtual serial port device when the virtual serial port device is identified for the first time, and modify a serial port name in a serial port output parameter of an operating system to be a name of the virtual serial port device.

In implementations, when sending and receiving the serial port data through the virtual serial port device, the processor 45 is specifically configured to: write first serial port data to a THR on the virtual serial port device through the high-speed serial bus, to allow the virtual serial port device to read and write thereof to a memory cache on the virtual acceleration device; or read second serial port data in a RBR from the virtual serial port device through the high-speed serial bus when detecting that a data ready status bit of a LSR of the virtual serial port device is 1.

Further, as shown in FIG. 4, the physical machine also includes: a communication component 46, a display 47, a power source component 48, an audio component 49, and other components. Only part of the components are schematically shown in FIG. 4, and it does not mean that the physical machine only includes those components shown in FIG. 4. It needs to be noted that the components within a dotted box in FIG. 4 are optional components, and not essential components, which may be decided based on a product form of the physical machine.

The communication component in FIG. 4 mentioned above is configured to facilitate wired or wireless communication of the device where the communication component is located with other devices. The device where the communication component is located can access wireless networks based on communication standards, such as WiFi, 2G, 3G, 4G/LTE, 5G and other mobile communication networks, or a combination thereof. In an exemplary embodiment, the communication component receives broadcast signals or broadcast related information from an external broadcast management system via a broadcast channel. In an exemplary embodiment, the communication component further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology, and other technologies.

The display in FIG. 4 above includes a screen, and the screen may include a liquid crystal display (LCD) and a touch panel (TP). If the screen includes a touch panel, the screen may be implemented as a touch screen to receive input signals from a user. The touch panel includes one or more touch sensors to sense touches, swipes, and gestures on the touch panel. The touch sensor may not only sense the boundary of a touching or sliding action, but also detect the duration and pressure associated with the touching or sliding action.

The power source component in FIG. 4 above provides power to various components of the device where the power source component is located. The power source component may include a power management system, one or more power sources, and other components associated with generating, managing, and distributing power to the device in which the power source component is located.

The audio component in FIG. 4 described above may be configured to output and/or input audio signals. For example, the audio component includes a microphone (MIC), which is configured to receive external audio signals when the device on which the audio component is located is in an operation mode, such as a call mode, a recording mode, and a speech recognition mode. The received audio signals may be further stored in the memory or sent via the communication component. In some embodiments, the audio component further includes a speaker for outputting audio signals.

One skilled in the art will understand that the embodiments of the present disclosure may be provided as methods, systems, or computer program products. Accordingly, the present disclosure may take a form of an entirely hardware embodiment, an entirely software embodiment, or an embodiment that combines software and hardware aspects. Furthermore, the present disclosure may take a form of a computer program product embodied on one or more computer-usable storage media (including but not limited to disk storage, CD-ROM, optical storage, etc.) having computer-usable program code embodied therein.

The embodiments of the present disclosure are described with reference to flowcharts and/or block diagrams of methods, apparatus (systems), and computer program products according to the embodiments of the present disclosure. It should be understood that each process and/or block of the flowcharts and/or block diagrams, and combinations of processes and/or blocks in the flowcharts and/or block diagrams, can be implemented by computer program instructions. These computer program instructions may be provided to a general purpose computer, a special purpose computer, an embedded processor, or a processor of other programmable device to produce a machine, to cause the instructions to generate an apparatus for implementing the functions specified in one or more processes of the flowcharts and/or one or more blocks of the block diagrams through the computer or the processor of other programmable device.

These computer program instructions may also be stored in a computer-readable storage device that can direct a computer or other programmable device to function in a particular manner, such that the instructions stored in the computer-readable storage device produce an article of manufacture including an instruction apparatus which implements the functions specified in one or more processes of the flowcharts and/or one or more blocks of the block diagrams.

These computer program instructions may also be loaded onto a computer or other programmable device to cause a series of operational steps to be performed on the computer or other programmable device so as to produce a computer implemented process, such that the instructions executed on the computer or other programmable device provide steps for implementing the functions specified in one or more processes of the flowcharts and/or one or more blocks of the block diagrams.

In a typical configuration, a computing device includes one or more processors (CPUs), an input/output interface, a network interface, and memory.

The memory may include non-permanent storage in computer-readable media, random access memory (RAM), and/or non-volatile memory in a form of read-only memory (ROM) or flash memory (flash RAM). The memory is an example of computer-readable media.

The computer-readable media includes both persistent and non-volatile, removable and non-removable media that can be implemented by any method or technology for storage of information. Information may be computer-readable instructions, data structures, modules of programs, or other data. Examples of computer storage media include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disc read-only memory (CD-ROM), digital versatile disc (DVD) or other optical storage, magnetic tape cassettes, tape magnetic disk storage or other magnetic storage devices, or any other non-transmission medium can be used to store information that can be accessed by a computing device. As defined herein, computer-readable media does not include transitory media, such as modulated data signals and carrier waves.

It should also be noted that the terms "including", "containing", or any other variations thereof are intended to cover a non-exclusive inclusion, such that a process, method, article, or apparatus that includes a list of elements not only includes those elements, but also includes other elements are not expressly listed or that are inherent to the process, method, article or device. Without further limitation, an element defined by a statement "including . . . a" does not exclude the presence of additional identical elements in a process, method, article, or device that includes such element.

The above descriptions are only examples of the present disclosure and are not intended to limit the present disclosure. For one skilled in the art, various modifications and variations may be made to the present disclosure. Any modifications, equivalent substitutions, improvements, etc. made within the spirit and principles of the present disclosure shall be included in the scope of the claims of the present disclosure.

The present disclosure can be further understood using the following clauses.

Clause 1: A computer device, comprising: a physical machine, and a virtual acceleration device, wherein: the virtual acceleration device is connected to the physical machine through a high-speed serial bus; a virtual serial port device for the physical machine is implemented on the virtual acceleration device, and configured to cooperate with the physical machine to send and receive serial port data; and the physical machine is configured to identify the virtual serial port device and send and receive the serial port data through the virtual serial port device.

Clause 2: The device according to Clause 1, wherein multiple registers required by the serial port device are configured on the virtual acceleration device, and the multiple registers are mapped into a configuration space of the virtual acceleration device for implementing virtual serial port devices.

Clause 3: The device according to Clause 2, wherein the physical machine is configured to: enumerate devices on the high-speed serial bus, and identify the virtual serial port device according to values of at least some registers in the configuration space when the virtual acceleration device is found.

Clause 4: The device according to Clause 3, wherein the physical machine is further configured to: name the virtual serial port device when the virtual serial port device is identified for the first time, and modify a serial port name in a serial port output parameter in an operating system to be a name of the virtual serial port device.

Clause 5: The device according to Clause 2, wherein the virtual acceleration device comprises: a processor, and a memory cache, the memory cache being configured to cache the serial port data sent and received by the physical machine through the virtual serial port device, wherein the processor is configured to read first serial port data written by the physical machine through the virtual serial port device from the memory cache and output the first serial port data, or write second serial port data that the physical machine needs to receive into the memory cache data to allow the virtual serial port device to read and send the second serial port data to the physical machine.

Clause 6: The device according to Clause 5, wherein: the multiple registers comprise at least: a transmission holding register (THR), and a line status register (LSR); the physical machine is configured to write the first serial port data to the THR through the high-speed serial bus; and the virtual serial port device is configured to output the first serial port data in the THR to the memory cache, and set a THR status bit in the LSR to 1.

Clause 7: The device according to Clause 5, wherein: the multiple registers comprise at least: a receive buffer register (RBR) and a line status register (LSR); the virtual serial port device is configured to write the second serial port data that is read from the memory cache into the RBR, and set a data ready status bit of the LSR to 1, and set the data ready status bit of the LSR to 0 after the second serial port data is read; and the physical machine is configured to read the second serial port data from the RBR through the high-speed serial bus when detecting that the data ready status bit of the LSR is 1.

Clause 8: The device according to Clause 5, wherein the virtual acceleration device comprises: a programmable logic device, and a first processing chip, the virtual serial port device being located on the programmable logic device, and the processor and the memory cache being located on the first processing chip.

Clause 9: The device according to Clause 8, wherein the programmable logic device is a field programmable logic gate array (FPGA), or a complex programmable logic device (CPLD), and the first processing chip is an application specific integrated circuit (ASIC) chip or a system-on-chip (SOC).

Clause 10: The device according to Clause 5, wherein the virtual acceleration device comprises a second processing chip, the virtual serial port device, the processor and the memory cache being all located in the second processing chip.

Clause 11: The device according to Clause 10, wherein the second processing chip is an ASIC chip or a SOC.

Clause 12: The device according to any one of Clauses 1 to 11, wherein the high-speed serial bus is a peripheral component interconnection (PCI) bus or a peripheral component interconnect express (PCIE) bus.

Clause 13: A virtual acceleration device, comprising: a high-speed serial bus; and a virtual serial port device implemented for a physical machine, wherein: the virtual acceleration device is connected to the physical machine through the high-speed serial bus, and the virtual serial port device is configured to cooperate with the physical machine to send and receive serial port data when the virtual acceleration device is connected to the physical machine through the high-speed serial bus.

Clause 14: The device according to Clause 13, further comprising: a processor, the processor being configured to implement the virtual serial port device for the physical machine on the virtual acceleration device, and cooperate with the physical machine to send and receive the serial port data through the virtual serial port device.

Clause 15: The device according to Clause 14, wherein: when the processor implements the virtual serial port device on the virtual acceleration device, the device is configured to: configure multiple registers required by the serial port device, and map the multiple registers into a configuration space of the virtual acceleration device for implementing the virtual serial port device.

Clause 16: The device according to Clause 15, further comprising: a memory cache configured to cache the serial port data sent and received by the physical machine through the virtual serial port device, wherein: when the processor cooperates with the physical machine to send and receive the serial port data through the virtual serial port device, the device is configured to: read first serial port data written by the physical machine through the virtual serial port device from the memory cache, and output the first serial port data, or write second serial port data to be received by the physical machine into the memory cache, to allow the virtual serial port device to read and send the second serial port data to the physical machine.

Clause 17: The device according to Clause 16, wherein: the multiple registers comprise at least: a transmission holding register (THR), and a line status register (LSR); and the virtual serial port device is configured to output the first serial port data in the THR to the memory cache after the physical machine writes the first serial port data into the THR through the high-speed serial bus, and set a THR status bit of LSR to 1.

Clause 18: The device according to Clause 16, wherein: the multiple registers comprise at least: a receive buffer register (RBR) and a line status register (LSR); and the virtual serial port device is configured to write the second serial port data that is read from the memory cache into the RBR, and set a data ready status bit of the LSR to 1, to allow the physical machine to read the second serial port data from the RBR through the high-speed serial bus, and set the data ready status bit of the LSR to 0 after the second serial port data is read.

Clause 19: A physical machine, comprising: a memory; and a processor, wherein: the memory is configured to store a computer program; the processor, which is coupled with the memory, is configured to execute the computer program to: identify a virtual serial port device, and send and receive serial port data through the virtual serial port device, wherein the virtual serial port device is implemented on a virtual acceleration device connected to the physical machine through a high-speed serial bus.

Clause 20: The device according to Clause 19, wherein: when the processor identifies the virtual serial port device, the device is configured to: enumerate devices on the high-speed serial bus, and identify the virtual serial port device according to values of at least some registers in a configuration space of the virtual acceleration device when the virtual acceleration device is found.

Clause 21: The device according to Clause 20, wherein the processor is further configured to: name the virtual serial port device, and modify a serial port name in a serial port output parameter in an operating system to be a name of the virtual serial port device when the virtual serial port device is identified for the first time.

Clause 22: The device according to Clause 21, wherein: when the processor sends and receives the serial port data through the virtual serial port device, the device is configured to: write first serial port data into a transmission holding register (THR) on the virtual serial port device through the high-speed serial bus, to allow the virtual serial port device to read and write thereof into a memory cache of the virtual acceleration device; or read second serial port data from a RBR of the virtual serial port device through the high-speed serial bus upon detecting that a data ready status bit of a LSR of the virtual serial port device is 1.

Clause 23: A data transmission method, which is applicable to a virtual acceleration device, and a virtual serial port device for a physical machine is implemented in the virtual acceleration device, and the method comprises: receiving first serial port data sent by the physical machine through the virtual serial port device, and output the first serial port data; or receiving second serial port data externally, and sending the second serial port data to the physical machine through the virtual serial port device, wherein the virtual acceleration device is connected to the physical machine through a high-speed serial bus.

Clause 24: A computer-readable storage medium storing a computer program, wherein the computer program, when executed by a processor, causes the processor to implement the steps of the method according to Clause 23.

Clause 25: A computer program product comprising computer program/instructions, wherein the computer program/instructions, when executed by a processor, causes the processor to implement the steps of the method according to Clause 23.

What is claimed is:

1. A computer device, comprising:
   a physical machine, and
   a virtual acceleration device, wherein:
   the virtual acceleration device is connected to the physical machine through a high-speed serial bus, and is a hardware device with software resources;
   a virtual serial port device for the physical machine is implemented on the virtual acceleration device, and configured to cooperate with the physical machine to send and receive serial port data; and
   the physical machine is configured to identify the virtual serial port device, send and receive the serial port data only through the virtual serial port device without using a built-in serial port device associated with the physical machine, and communicate the serial port data with a target device external to the computer device only through the virtual acceleration device.

2. The computer device according to claim 1, wherein multiple registers required by the serial port device are configured on the virtual acceleration device, and the multiple registers are mapped into a configuration space of the virtual acceleration device for implementing virtual serial port devices.

3. The computer device according to claim 2, wherein the physical machine is configured to: enumerate devices on the high-speed serial bus, and identify the virtual serial port device according to values of at least some registers in the configuration space when the virtual acceleration device is found.

4. The computer device according to claim 3, wherein the physical machine is further configured to:
   name the virtual serial port device when the virtual serial port device is identified for a first time, and modify a serial port name in a serial port output parameter in an operating system to be a name of the virtual serial port device.

5. The computer device according to claim 2, wherein the virtual acceleration device comprises: a processor, and a memory cache, the memory cache being configured to cache the serial port data sent and received by the physical machine through the virtual serial port device, wherein the processor is configured to read first serial port data written by the physical machine through the virtual serial port device from the memory cache and output the first serial port data, or write second serial port data that the physical machine needs to receive into the memory cache data to allow the virtual serial port device to read and send the second serial port data to the physical machine.

6. The computer device according to claim 5, wherein:
   the multiple registers comprise at least: a transmission holding register (THR), and a line status register (LSR);
   the physical machine is configured to write the first serial port data to the THR through the high-speed serial bus; and
   the virtual serial port device is configured to output the first serial port data in the THR to the memory cache, and set a THR status bit in the LSR to 1.

7. The computer device according to claim 5, wherein:
the multiple registers comprise at least: a receive buffer register (RBR) and a line status register (LSR);
the virtual serial port device is configured to write the second serial port data that is read from the memory cache into the RBR, and set a data ready status bit of the LSR to 1, and set the data ready status bit of the LSR to 0 after the second serial port data is read; and
the physical machine is configured to read the second serial port data from the RBR through the high-speed serial bus when detecting that the data ready status bit of the LSR is 1.

8. The computer device according to claim 5, wherein the virtual acceleration device comprises: a programmable logic device, and a first processing chip, the virtual serial port device being located on the programmable logic device, and the processor and the memory cache being located on the first processing chip.

9. The computer device according to claim 8, wherein the programmable logic device is a field programmable logic gate array (FPGA), or a complex programmable logic device (CPLD), and the first processing chip is an application specific integrated circuit (ASIC) chip or a system-on-chip (SOC).

10. The computer device according to claim 5, wherein the virtual acceleration device comprises a second processing chip, the virtual serial port device, the processor and the memory cache being all located in the second processing chip.

11. The computer device according to claim 10, wherein the second processing chip is an application specific integrated circuit (ASIC) chip or a system-on-chip (SOC).

12. The device according to claim 1, wherein the high-speed serial bus is a peripheral component interconnection (PCI) bus or a peripheral component interconnect express (PCIE) bus.

13. A virtual acceleration device, comprising:
a high-speed serial bus; and
a virtual serial port device implemented for a physical machine, wherein:
the virtual acceleration device is connected to the physical machine through the high-speed serial bus, and
the virtual serial port device is configured to cooperate with the physical machine to send to and receive from a target device external to a computer device including the physical machine and the virtual acceleration device only through the virtual acceleration device, serial port data, when the virtual acceleration device is connected to the physical machine through the high-speed serial bus.

14. The virtual acceleration device according to claim 13, further comprising: a processor, the processor being configured to implement the virtual serial port device for the physical machine on the virtual acceleration device, and cooperate with the physical machine to send and receive the serial port data through the virtual serial port device.

15. The virtual acceleration device according to claim 14, wherein: when the processor implements the virtual serial port device on the virtual acceleration device, the device is configured to:
configure multiple registers required by the serial port device, and map the multiple registers into a configuration space of the virtual acceleration device for implementing the virtual serial port device.

16. The virtual acceleration device according to claim 15, further comprising: a memory cache configured to cache the serial port data sent and received by the physical machine through the virtual serial port device, wherein:
when the processor cooperates with the physical machine to send and receive the serial port data through the virtual serial port device, the device is configured to: read first serial port data written by the physical machine through the virtual serial port device from the memory cache, and output the first serial port data, or write second serial port data to be received by the physical machine into the memory cache, to allow the virtual serial port device to read and send the second serial port data to the physical machine.

17. The virtual acceleration device according to claim 16, wherein:
the multiple registers comprise at least: a transmission holding register (THR), and a line status register (LSR); and
the virtual serial port device is configured to output the first serial port data in the THR to the memory cache after the physical machine writes the first serial port data into the THR through the high-speed serial bus, and set a THR status bit of LSR to 1.

18. The virtual acceleration device according to claim 16, wherein:
the multiple registers comprise at least: a receive buffer register (RBR) and a line status register (LSR); and
the virtual serial port device is configured to write the second serial port data that is read from the memory cache into the RBR, and set a data ready status bit of the LSR to 1, to allow the physical machine to read the second serial port data from the RBR through the high-speed serial bus, and set the data ready status bit of the LSR to 0 after the second serial port data is read.

19. A physical machine comprising:
a memory; and
a processor, wherein:
the memory is configured to store a computer program;
the processor, which is coupled with the memory, is configured to execute the computer program to: identify a virtual serial port device, and send and receive serial port data from a target device external to a computer device including the physical machine and a virtual acceleration device only through the virtual serial port device, wherein the virtual serial port device is implemented on the virtual acceleration device connected to the physical machine through a high-speed serial bus.

20. The physical machine according to claim 19, wherein: when the processor identifies the virtual serial port device, the device is configured to:
enumerate devices on the high-speed serial bus, and identify the virtual serial port device according to values of at least some registers in a configuration space of the virtual acceleration device when the virtual acceleration device is found.

* * * * *